(12) United States Patent
Nojima

(10) Patent No.: US 7,933,406 B2
(45) Date of Patent: Apr. 26, 2011

(54) ENCRYPTION DEVICE AND METHOD, AND IMAGE FORMING APPARATUS

(75) Inventor: Koji Nojima, Abiko (JP)

(73) Assignee: Canon Kabushiki Kaisha (JP)

(*) Notice: Subject to any disclaimer, the term of this patent is extended or adjusted under 35 U.S.C. 154(b) by 1042 days.

(21) Appl. No.: 11/736,745

(22) Filed: Apr. 18, 2007

(65) Prior Publication Data

US 2008/0044022 A1 Feb. 21, 2008

(30) Foreign Application Priority Data

Apr. 18, 2006 (JP) ................................ 2006-114455

(51) Int. Cl.
*G09C 5/00* (2006.01)
(52) U.S. Cl. ........................................................ 380/55
(58) Field of Classification Search .................. 382/173, 382/174, 175, 177, 239; 283/85, 86, 93, 283/17, 73; 380/55, 54
See application file for complete search history.

(56) References Cited

U.S. PATENT DOCUMENTS 6,999,588 B1 * 2/2006 Oishi ............................ 380/246
2003/0123696 A1 * 7/2003 Matsumoto et al. .......... 382/100

FOREIGN PATENT DOCUMENTS

JP 11-041383 A 2/1999

* cited by examiner

*Primary Examiner* — Edward Zee
(74) *Attorney, Agent, or Firm* — Rossi, Kimms & McDowell LLP

(57) ABSTRACT

An encryption device which is capable of preparing an encrypted document not easily deciphered by a third person. The encryption device encrypts information formed on a recording member on the basis of a predetermined encryption code. A surface of the recording member is irradiated with light. An image of the irradiated surface of the recording member irradiated with the light is taken. The encryption code is prepared on the basis of the taken image of the irradiated surface.

7 Claims, 7 Drawing Sheets

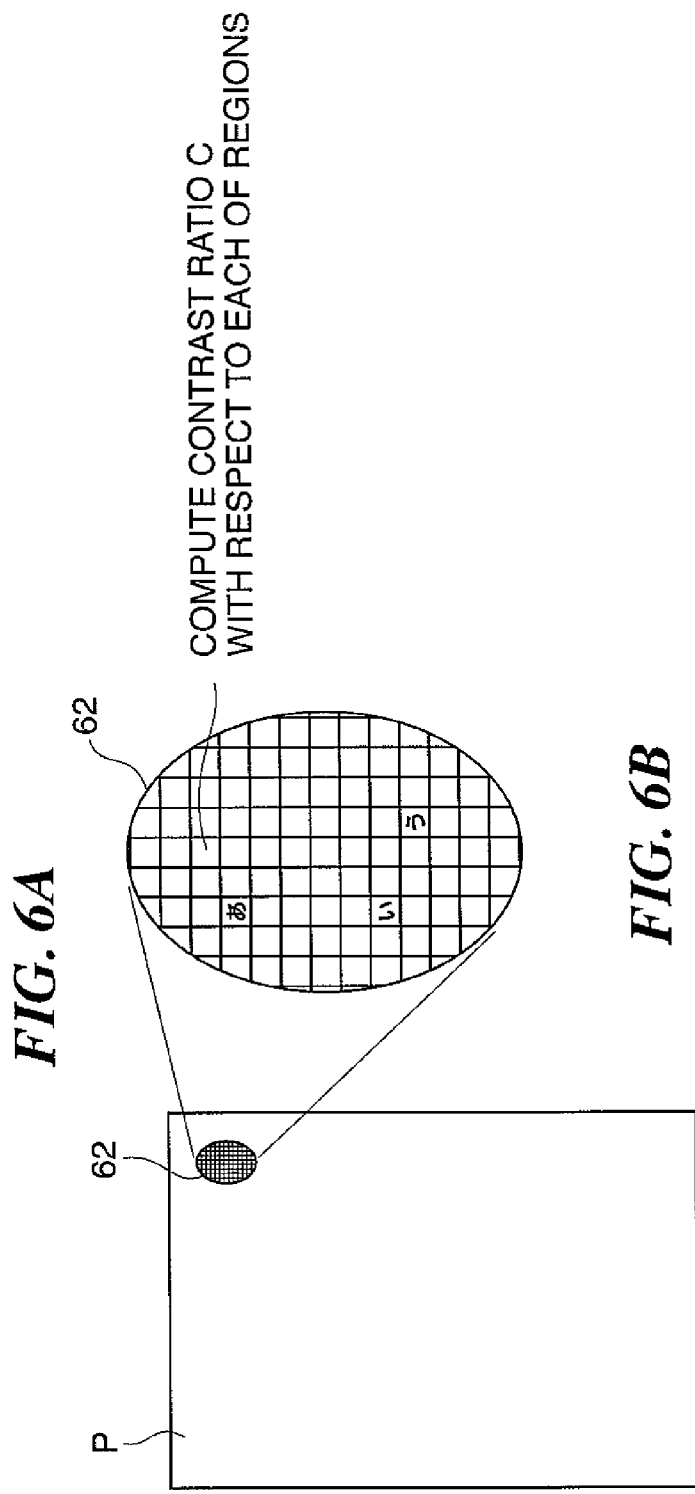

ENCRYPTION DEVICE AND METHOD, AND IMAGE FORMING APPARATUS

BACKGROUND OF THE INVENTION

1. Field of the Invention

The present invention relates to an encryption device and method which encrypt sentences or the like, and to an image forming apparatus.

2. Description of the Related Art

In these days, electronization of information is being advanced and duplicable electronized information is easily encrypted by making use of various encryption methods in order to protect the electronized information. For example, in an image forming apparatus such as a printing machine capable of forming an image by receiving a printing command from a personal computer (PC), information stored therein and information to be output are encrypted.

A conventional image forming apparatus receives, for example, from a PC, a command to print a document 70a (FIG. 7A) as a secret document including an encryption-unneeded portion 71 and an encryption-needed portion 72, and encrypts only the encryption-needed portion 72 in the document 70a into an encrypted portion such as an encrypted portion 73 in a document 70b (FIG. 7B). The encryption-unneeded portion 71 is a portion through which the contents of the document 70 can be roughly understood. When the document 70b is received, the document 70b is read by using an image reading apparatus such as a scanner and is converted into character data by character recognition processing. Thereafter, the document 70b can be converted into the document 70a by decrypting and deciphering the encrypted portion 73.

The above-described encryption method ordinarily uses a random number table (see, for example, Japanese Laid-Open Patent Publication (Kokai) No. 11-41383). This method encrypts a document by converting it into an amphibology random sequence of characters, as the encrypted portion 73, on the basis of a conversion code table prepared by utilizing the randomness of the random number table. The encrypted document is read by an image reading apparatus in which the conversion code table is stored, to thereby be decrypted into the not-yet encrypted document.

However, the above-described conventional encryption method encrypts and decrypts a document on the basis of a conversion code table; therefore, if the conversion code table is duplicated by a third person, the encrypted document can be easily decrypted and deciphered by the third person.

The conversion code table can be easily duplicated independently of whether or not it is electronized information or printed information. After duplication of the conversion code table, no trances of duplication are left. Therefore, the person having the document in his/her possession cannot infer the possibility that the conversion code table for the document is duplicated and information of the document is leaked.

The conversion code table should be stored both in the image forming apparatus that encrypts the document and in the image reading apparatus that decrypts the document. Thus, the conversion code tables exist in a plurality of places, thereby increasing the risk of the conversion code table being accessed by a third person.

SUMMARY OF THE INVENTION

The present invention provides an encryption device and method, and an image forming apparatus which are capable of preparing an encrypted document not easily deciphered by a third person.

In a first aspect of the invention, there is provided an encryption device that encrypts information formed on a recording member on the basis of a predetermined encryption code, the device comprising: an irradiation section adapted to irradiate a surface of the recording member with light; an image taking section adapted to take an image of the irradiated surface of the recording member irradiated with the light; and a preparation section adapted to prepare the encryption code on the basis of the taken image of the irradiated surface.

The encryption device can further comprise a computation section adapted to compute a predetermined unique value with respect the taken image of the irradiated surface, wherein the preparation section is adapted to prepare the encryption code on the basis of the computed unique value.

The information can be constituted by a sequence of characters including at least one character, and the encryption device can further comprising a dividing section adapted to divide the taken image of the irradiated surface into a predetermined number of regions, an assignment section adapted to assign all the characters constituting the sequence of characters to the divided regions, and a computation section adapted to compute a predetermined unique value with respect to each of the divided regions, and the preparation section can be adapted to prepare the encryption code by replacing all the characters respectively assigned to the divided regions with the predetermined unique values computed with respect to the regions.

The encryption device can further comprise an erasing section adapted to erase the encryption code prepared by the preparation section, when the encrypted information is formed on the recording member.

In a second aspect of the invention, there is provided an encryption method of encrypting information formed on a recording member on the basis of a predetermined encryption code, the method comprising: an irradiation step of irradiating a surface of the recording member with light; an image taking step of taking an image of the irradiated surface of the recording member irradiated with the light; and a preparation step of preparing the encryption code on the basis of the taken image of the irradiated surface.

The encryption method can further comprise a computation step of computing a predetermined unique value with respect the taken image of the irradiated surface, wherein the preparation step includes preparing the encryption code on the basis of the computed unique value.

The information can be constituted by a sequence of characters including at least one character, and the encryption method can further comprise a dividing step of dividing the taken image of the irradiated surface into a predetermined number of regions, an assignment step of assigning all the characters constituting the sequence of characters to the divided regions, and a computation step of computing a predetermined unique value with respect to each of the divided regions, and the encryption code can prepared in the preparation step by replacing all the characters respectively assigned to the divided regions with the unique values computed with respect to the regions.

The encryption method can further comprise an erasing step of erasing the encryption code prepared by the preparation section, when the encrypted information is formed on the recording member.

In a third aspect of the invention, there is provided an image forming apparatus comprising the above-mentioned encryption device According to the present invention, the surface of the recording member is irradiated with light, an image of the irradiated surface of the recording member irradiated with the light is taken, and an encryption code is prepared on the basis of the taken image of the irradiated surface. Accordingly, deciphering the encrypted document recorded on the recording member requires preparing the encryption code from the original document. Therefore, the encryption code for deciphering the encrypted document cannot be prepared from any duplicate of the original document, which enables an encrypted document difficult for a third person to decipher to be prepared.

The above and other objects, features, and advantages of the invention will become more apparent from the following detailed description taken in conjunction with the accompanying with drawings.

BRIEF DESCRIPTION OF THE DRAWINGS

FIGS. 6A and 6B are views for explaining a method of preparing an encryption code table prepared by the encryption device shown in FIG. 2, FIG. 6A being a view which is useful in explaining division of the irradiation surface into regions and assignment of characters, and FIG. 6B being a view showing an example of the encryption code table.

DETAILED DESCRIPTION OF THE PREFERRED EMBODIMENTS

An embodiment of the present invention will be described in detail with reference to the accompanying drawings.

Figure 1:
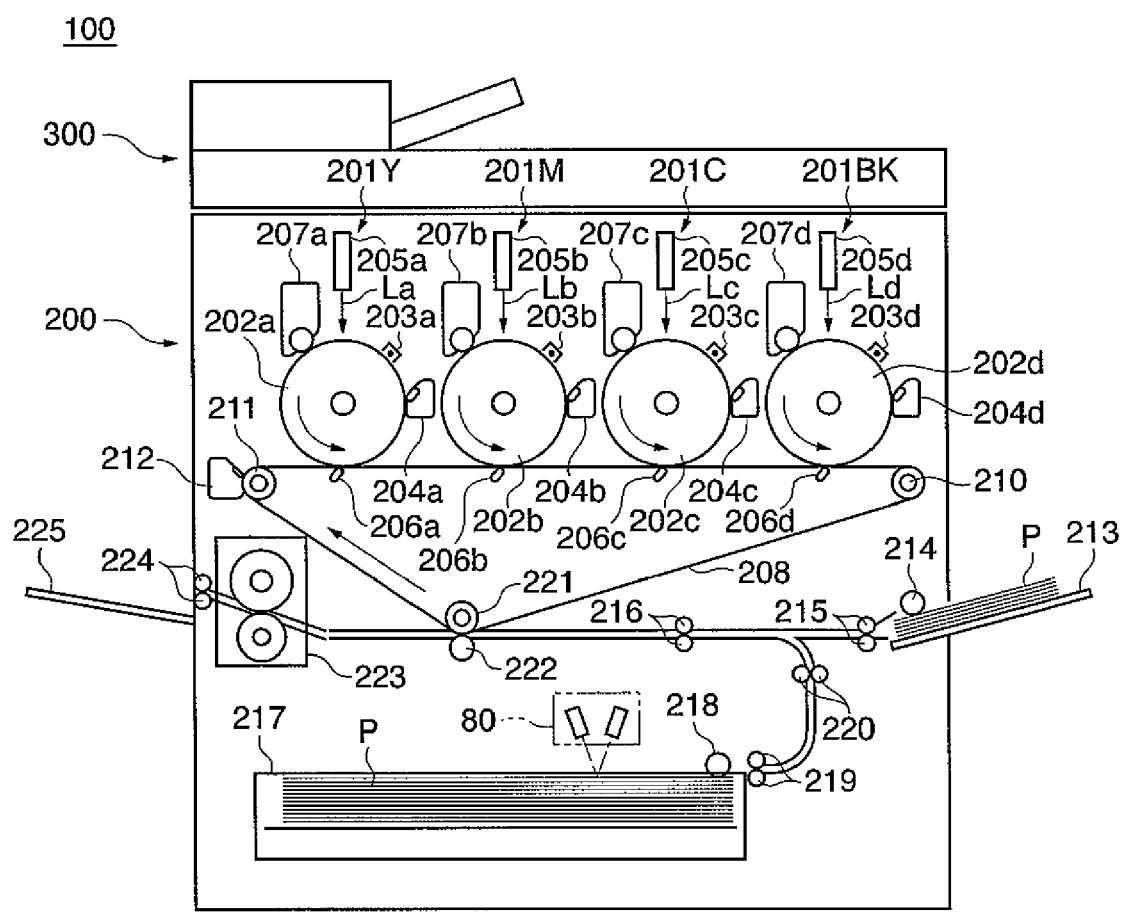
FIG. 1 is a view schematically showing a configuration of an image processing apparatus having an encryption device according to an embodiment of the present invention, more particularly a configuration of an essential portion of an image forming apparatus having the encryption device.

FIG. 1 is a view schematically showing a configuration of an image processing apparatus having an encryption device according to an embodiment of the present invention, more particularly a configuration of an essential portion of an image forming apparatus having the encryption device.

Referring to FIG. 1, an image processing apparatus 100 includes an image forming apparatus 200, of a tandem type multi-transfer system, having an encryption device 80 described hereinbelow with reference to FIG. 2, and an image reading apparatus 300 mounted on the image forming apparatus 200.

The image forming apparatus 200 has image generating units 201Y, 201M, 201C, and 201BK (a tandem type multi-transfer system) corresponding to yellow, magenta, cyan, and black, respectively, as shown in FIG. 1. The image generating units 201Y, 201M, 201C, and 201BK, respectively, have photosensitive drums 202a to 202d provided as image bearing members, charger units 203a to 203d, and cleaners 204a to 204d. Also, each of the image generating units 201Y, 201M, 201C, and 201BK has a laser scanning unit 205a to 205d, a transfer blade 206a to 206d, and a developing unit 207a to 207d.

The image forming apparatus 200 also has an intermediate transfer belt 208, rollers 210 and 211 which support the intermediate transfer belt 208, an intermediate transfer belt cleaner 212. The image forming apparatus 200 also includes a manual paper feed tray 213 and a paper feed cassette 217 containing recording sheets P, pickup rollers 214, 215, 218, and 129 for picking up recording sheets P, a fixing unit 223, and a stacking tray 225. The image forming apparatus 200 further has a vertical path roller 220, a registration roller 216, a rotation roller 221, a secondary transfer roller 222, a discharging roller 224, and the encryption device 80, described hereinbelow with reference to FIG. 2, disposed above the paper feed cassette 217.

The surface of each of the photosensitive drums 202a to 202d is charged to a uniform electric potential by the corresponding one of the charger units 203a to 203d and is then scanned by the corresponding one of the laser scanning units 205a to 205d and exposed to the corresponding one of laser beams La to Ld according to the image data. As a result, electrostatic latent images according to image data are formed on the surfaces of the photosensitive drums 202a to 202d. The electrostatic latent images formed on the surface of each of the photosensitive drums 202a to 202d is visualized as a toner image of corresponding color component by toner supplied from the associated developing units 207a to 207d.

The toner images formed on the photosensitive drums 202a to 202d are successively transferred onto the intermediate transfer belt 208 and superposed one on another by the transfer blades 206a to 206d. This transfer is hereinafter referred to as "the primary transfer". A superimposed color toner image is thereby formed on the intermediate transfer belt 208. This color toner image is carried and conveyed by the intermediate transfer belt 208 and is transferred onto a recording sheet P between the rotation roller 221 and the secondary transfer roller 222.

On the other hand, the recording sheet P is fed from the manual feed tray 213 or the paper feed cassette 217 and conveyed to the secondary transfer roller 222 with registration timing taken by the registration roller 216. The transporting components, i.e., the pickup rollers 214, 215, 218, and 219, the vertical path roller 220 and the registration roller 216 that conveys the recording sheet P, are individually driven by independent stepping motors (not shown) to achieve a fast, stable transport operation.

The recording sheet P having the color toner image transferred thereon is fed to the fixing unit 223. The fixing unit 223 applies heat and pressure to the recording sheet P to fix the color toner image to the recording sheet P. A permanent color image is thereby formed on the recording sheet P. Thereafter, the recording sheet P is discharged onto the stacking tray 225 by the discharging roller 224.

Toner can remain on the surface of each of the photosensitive drums 202a to 202d after the primary transfer to the intermediate transfer belt 208. The residual toner is scraped off and collected by the corresponding one of the cleaners 204a to 204d. Residual toner on the intermediate transfer belt 208 is scrapped off from the intermediate transfer belt 208 and collected by the intermediate transfer belt cleaner 212.

The image reading apparatus 300 has a feeder (not shown) which feeds originals one by one, and an original-reading platen (not shown) on which each of the fed originals is placed. The image reading apparatus 300 also has an operating panel (not shown) on its upper surface. A user can set an original in the feeder, make operation settings, e.g., a setting of the number of prints, a selection of paper feed cassettes containing recording sheets P, and a selection of stacking trays, through the operating panel. The user can also transmit image data from a personal computer (not shown) to the image processing apparatus 100 and causes the image processing apparatus 100 to produce an output image on the basis of the image data.

Figure 2:
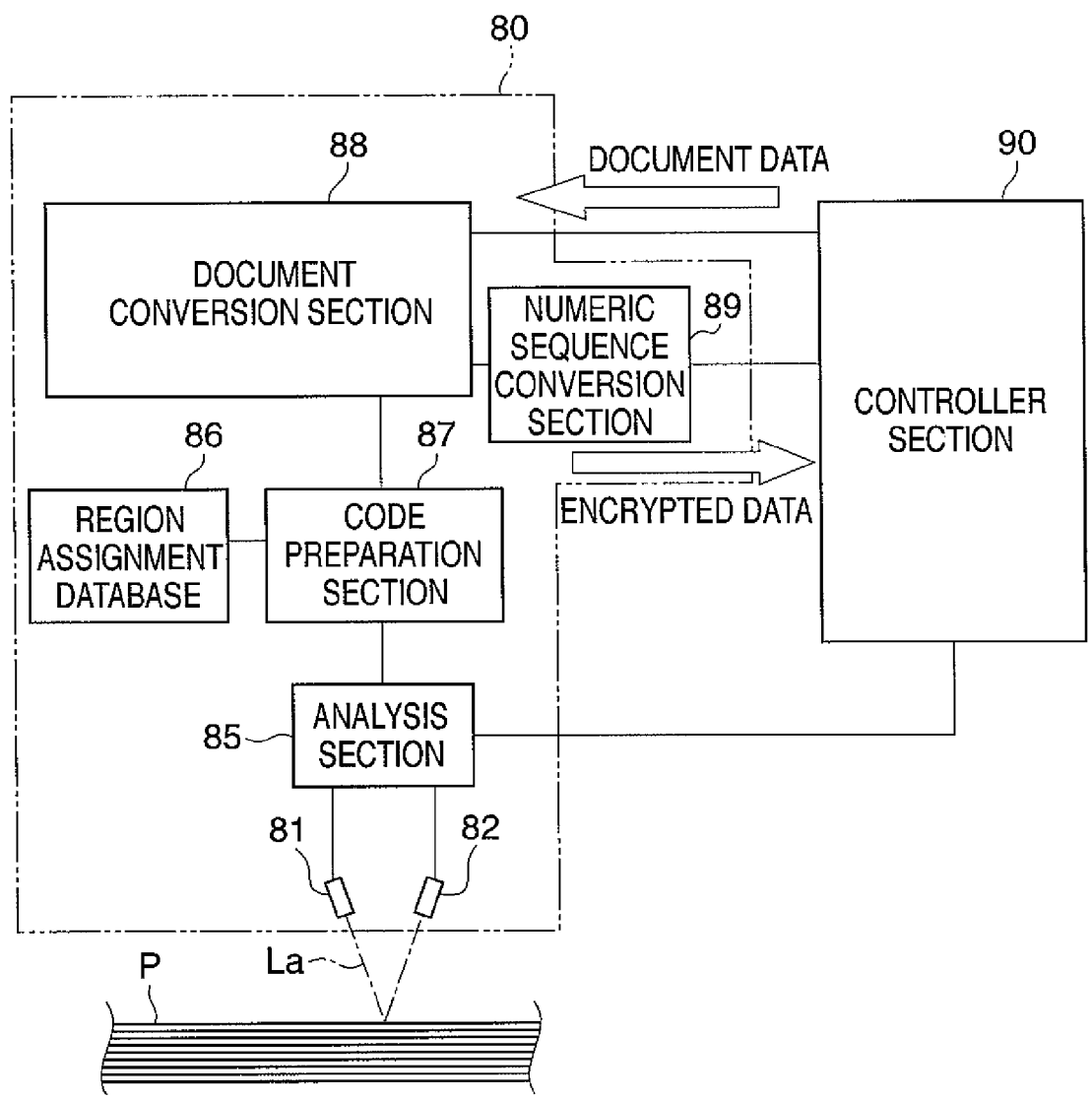
FIG. 2 is a block diagram schematically showing the configuration of the encryption device shown in FIG. 1.

FIG. 2 is a block diagram schematically showing the configuration of the encryption device 80 shown in FIG. 1.

Referring to FIG. 2, the encryption device 80 has an irradiation portion 81 for irradiating a predetermined irradiation surface 62 of the recording sheet P (FIG. 6A) with the laser beam La, and an image taking portion 82 for taking an image of the irradiation surface 62 irradiated with the laser beam La. The irradiation portion 81 is constituted by a laser diode (not shown) for irradiation with the lease beam La and a lens (not shown) which increases the beam spot diameter of the laser beam La on the irradiation surface 62 irradiated with the laser beam La, to about 5 mm.

Description will be made of an image taken in the image taking portion 82.

Figure 3:
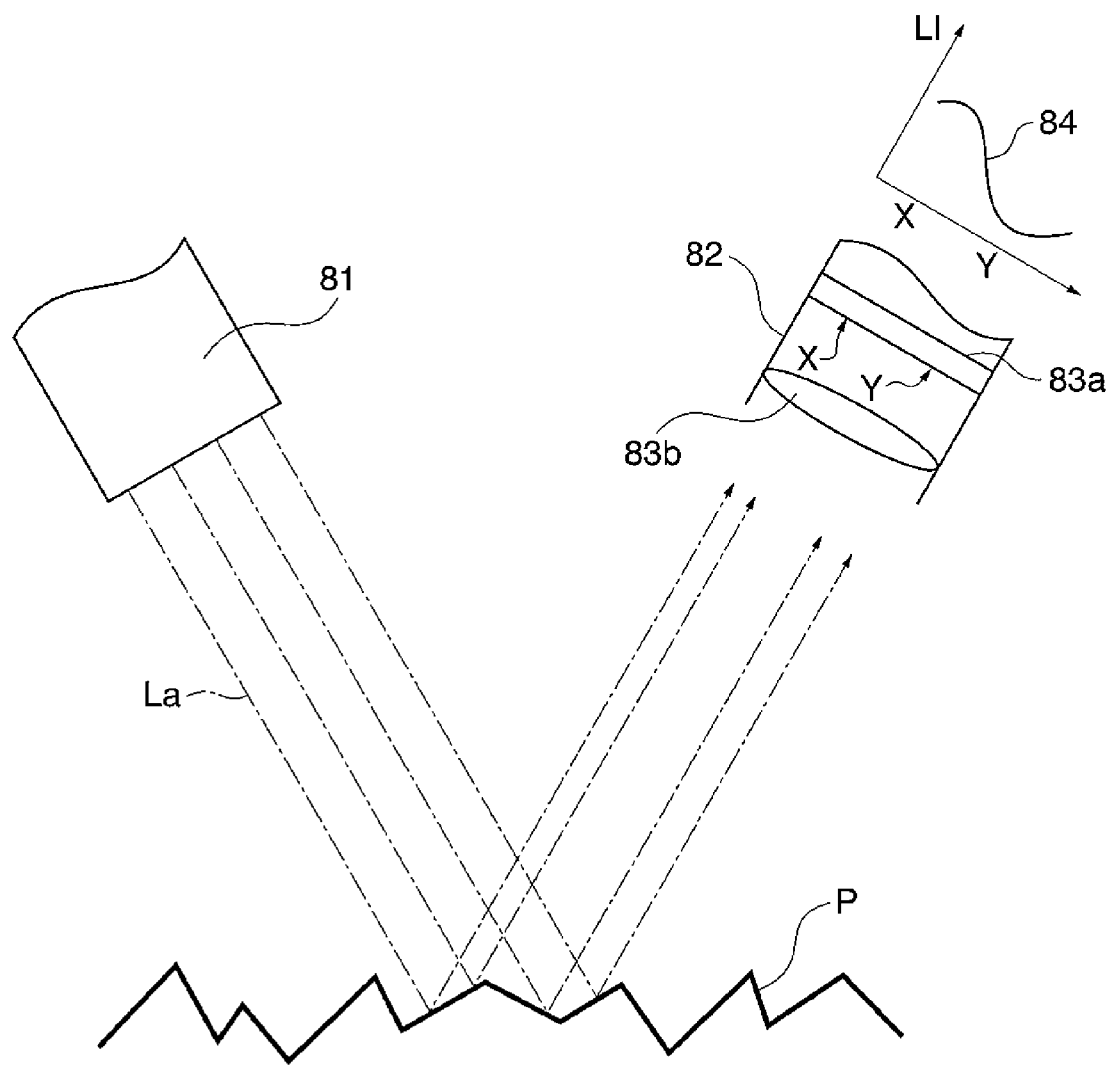
FIG. 3 is a view schematically showing an enlarged view of an irradiation portion, an image taking portion shown in FIG. 2, and an irradiation surface the recording sheet.

FIG. 3 is a view schematically showing an enlarged view of the irradiation portion 81, the image taking portion 82 shown in FIG. 2, and the irradiation surface of the recording sheet P.

Figure 4:
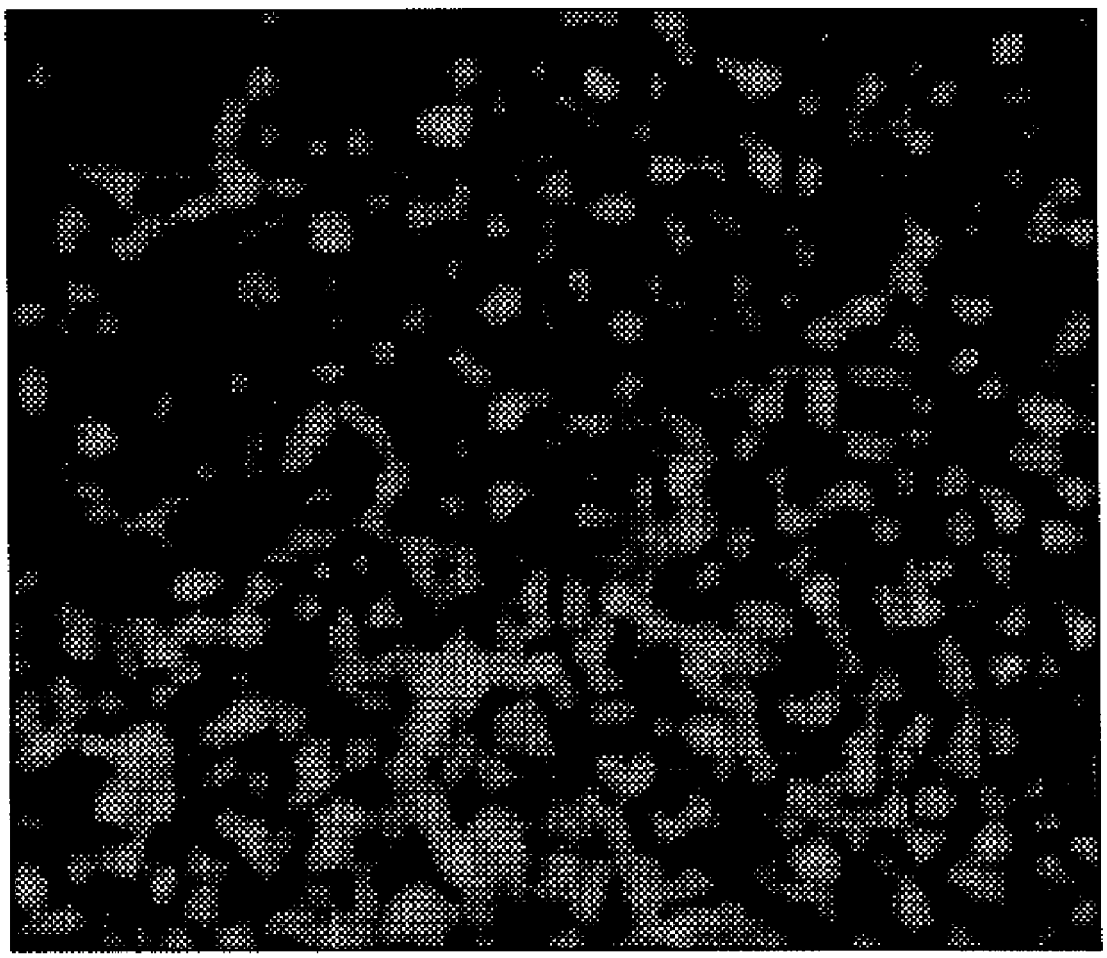
FIG. 4 is a view showing an example of a speckle pattern image taken with a CCD sensor shown in FIG. 3.

The laser beam La emitted from the irradiation portion 81 is reflected by irregularities in the irradiation surface of the recording sheet P to produce scattering light. The scattering light travel to a surface of a CCD sensor 83*a* through a lens 83*b* in the image taking portion 82. Waves of the scattering light interfere with each other since they travel through optical paths differing in length depending on the reflected position on the irradiation surface. The CCD sensor 83*a* receives the scattering light waves interfering with each other to take an image, such as shown in FIG. 4, called a speckle pattern. Irregularities in the recording sheet irradiation surface vary among recording sheets. Correspondingly, waves of scattering light reflected by the irregularities in the irradiation surface interfere differently among the recording sheets. The CCD sensor 83*a* takes a unique speckle pattern image with respect to each of the recording sheets.

A graph 84 shown in FIG. 3 shows the relationship between positions X and Y on the CCD sensor 83*a* and the intensity of light LI. The graph 84 schematically shows changes in intensity of light caused by interference in the above-described scattering light. Since the states of irregularities on the recording sheet irradiation surface vary among the recording sheets, the graph 84 has a unique form with respect to each of the recording sheets.

As described above, the CCD sensor 83*a* takes a unique speckle pattern image with respect to each of the recording sheets An analysis section 85 described below analyzes the image taken by the CCD sensor 83*a* to compute unique numeric values corresponding to the image. For example, if the CCD sensor 83*a* is constituted by N (counting number) pixels, a contrast ratio C can be computed as the magnitude of a brightness-darkness difference in the entire speckle pattern from the light intensities of the N pixels. If the light intensity of the N-th pixel is In, the average of the light intensities of all the pixels is expressed by the following equation (1).

$$<I> = \frac{1}{N}\sum_{N} In \qquad (1)$$

The above-described contrast ratio C can be expressed by the following equation (2).

$$C = \frac{\frac{1}{N}\sum_{N}|<I>-In|}{<I>} \qquad (2)$$

The brightness-darkness difference in the entire speckle pattern can be grasped as a periodic value, i.e., image frequency F. The image frequency F can be obtained by performing Fourier transform of the light intensity with respect to each of the pixels.

The values of the above-described contrast ratio C and image frequency F vary depending on the state of irregularities in the recording sheets irradiation surface and are, therefore, unique to the irradiation surfaces of the recording sheets. It is, therefore, possible to determine the differences between individual recording sheets from the differences between the numeric values.

Referring again to FIG. 2, the encryption device 80 also has an analysis section 85, a code preparation section 87, and a region assignment database 86. The analysis section 85 divides an image taken by the image taking portion 82 into a predetermined number of regions, and computes the above-described contrast ratio C, image frequency F or the like (FIG. 6A) with respect to each of the regions. The code preparation section 87 prepares an encryption code table 60 (FIG. 6B) on the basis of the result of computation obtained by the analysis section 85 with respect to each of the regions. The region assignment database 86 stores the regions to which characters constituting a document are assigned on the basis of the result computation by the analysis section 85 with respect to each of the regions. The code preparation section 87 prepares the encryption code table 60 by associating the characters constituting the document with the results of computation on the regions to which the characters are assigned.

The encryption device 80 further has a document conversion section 88, and a numeric conversion section 89. The document conversion section 88, receives document data transmitted from a controller section 90 in the image processing apparatus 100, and encrypts an encryption-needed portion in the document data by converting the portion into a numeric sequence with reference to the encryption code table 60 prepared by the code preparation section 87. The document conversion section 88 transmits the converted document data to the numeric conversion section 89. The numeric conversion section 89 converts the document data expressed by the numeric sequence into the document data expressed by the character sequence. The printing region for the document data can be reduced in this way. The numeric conversion section 89 transmits the encrypted document data expressed by the character sequence to the controller section 90.

The procedure of encryption of a document in the embodiment of the present invention will be described.

Figure 5:
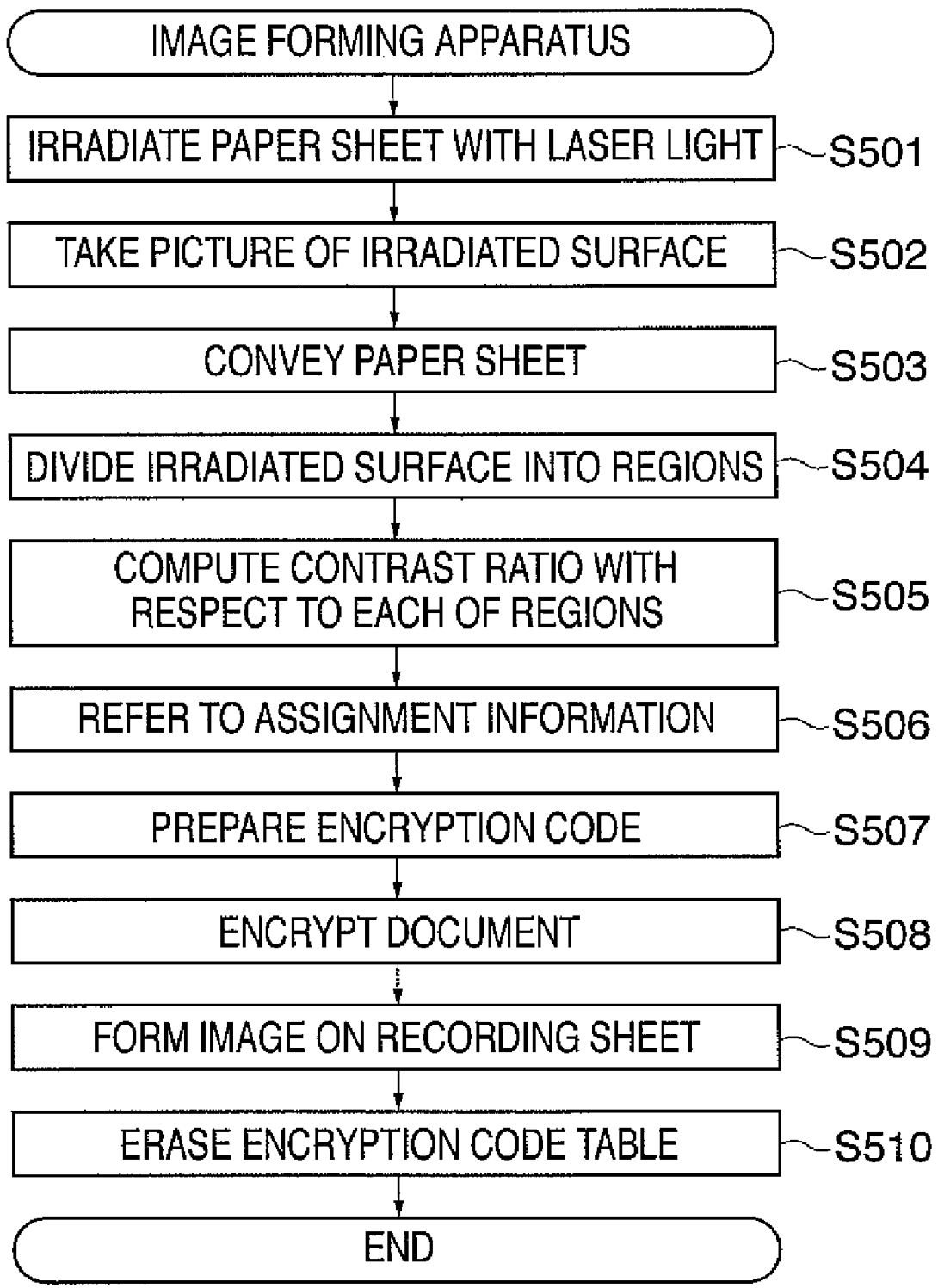
FIG. 5 is a flowchart showing the procedure of image forming processing executed by the image processing apparatus shown in FIG. 1.

FIG. 5 is a flowchart showing the procedure of image forming processing executed by the image processing apparatus 100 shown in FIG. 1.

Processing shown in FIG. 5 is executed by a CPU (not shown) in the image processing apparatus 100. It is assumed that this CPU has a read-only memory (ROM) in which a control program is written and a random access memory (RAM) for storing data for performing processing, and that the ROM and the RAM are connected by an address bus and a data bus.

Figure 7A:
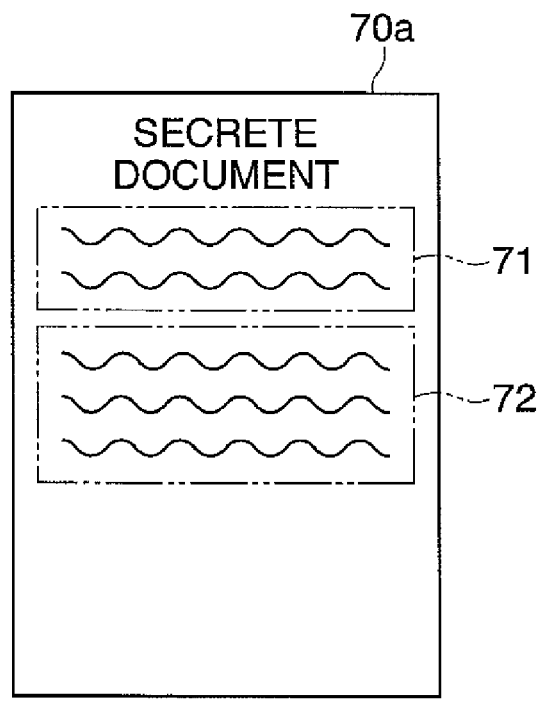
FIGS. 7A and 7B are views for explaining a document as a secrete document, FIG. 7A showing a not-yet encrypted state, and FIG. 7B showing an already encrypted state.

Referring to FIG. 5, an operator first inputs, from a PC (not shown) or the like to the image processing apparatus 100, a printing command including information which specifies, for example, the encryption-needed portion 72 in the document 70a shown in FIG. 7A. The image processing apparatus 100 then starts operating for image forming. Immediately before the image processing apparatus 100 transports a recording sheet P on which an image is to be formed, it radiates laser beam La from the encryption device 80 to a predetermined position on the recording sheet P (step S501) (irradiation section) and takes an image of the irradiation surface 62 (FIG. 6A) irradiated with the laser beam La (step S502) (image taking section). The recording sheet P is then conveyed to form an image thereon (step S503). On the other hand, the analysis section 85 in the encryption device 80 divides the irradiation surface 62 into regions as shown in FIG. 6A (step S504) (dividing section) and computes the contrast ratio C with respect to each of the divided regions (step S505) (computation section). While the contrast ratio C is computed in step S505 in this processing, the image frequency F may alternatively be computed or both the contrast ratio C and the image frequency F may be computed and combined together.

The contrast ratio C computed in step S505 with respect to each of the regions is transmitted to the code preparation section 87. The code preparation section 87 assigns the characters in the encryption-needed portion 72 in the document 70a to the regions by referring to the character assignment information stored in the region assignment database 86 (step S506) (assignment section), and associates the characters in the encryption-needed portion 72 with the results of computation of the contrast ratio C in the regions to which the characters are assigned, thereby preparing an encryption code table such as the table 60 shown in FIG. 6(B) (step S507) (preparation section).

Figure 7B:
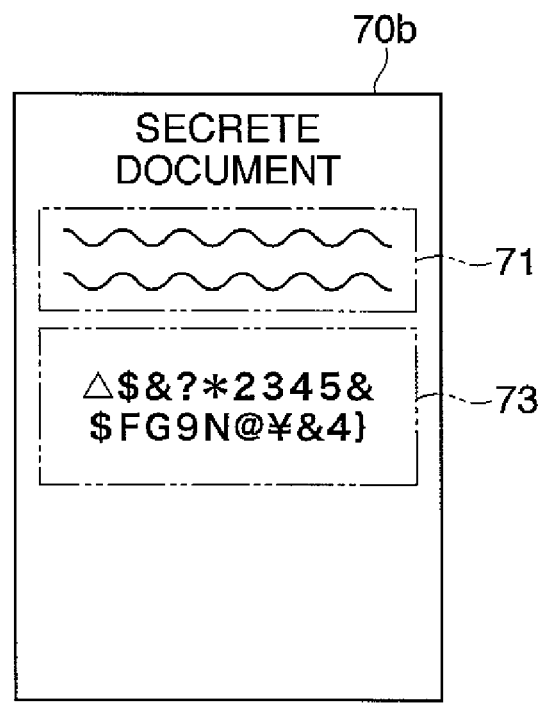

On the other hand, the document conversion section 88 that has received the document data on the document 70a from the controller section 90 in the image processing apparatus 100 encrypts only the encryption-needed portion 72 in the document 70a (step S508) by referring to the encryption code table 60 prepared in step S507. The document conversion section 88 transmits the encrypted document data to the controller section 90 via the character sequence conversion section 89, and the image processing apparatus 100 forms the image of the document 70b shown in FIG. 7(B) on the recording sheet P on the basis of the transmitted document data and outputs the recording sheet P on which the image is formed (step S509).

Subsequently, the document conversion section 88 completely erases the encryption code table 60 from the code preparation section 87 to thereby completely erase the encryption code table 60 in the image processing apparatus 100 (step S510) (erasing section), followed by terminating the procedure.

In a case where deciphering is performed on the recording sheet P output in step S509, the document 70b is read by an image reading apparatus such as a scanner, as in the prior art, and is converted into character data by character recognition processing. In this embodiment, however, the encryption code table 60 necessary for deciphering can be prepared by irradiating the recording sheet on which the image of the document 70b is formed with the laser beam at the predetermined position, and by computing the contrast ratio C with respect to each of the regions constituting the irradiation surface. For deciphering of the document 70b, therefore, the original document is required. A duplicate of the original document has an irradiation surface speckle pattern different from that of the original. It is, therefore, impossible to decipher the document 70b from any duplicate.

In image forming processing shown in FIG. 5, an image of the irradiation surface 62 of the recording sheet P irradiated with the laser beam La is taken (step S502); the encryption code table 60 is prepared on the basis of the taken image of the irradiation surface 62 (step S507); the document 70a is encrypted (step S508); and the encryption code table 60 is erased (step S510). Therefore there is no risk of the encryption code being duplicated by a third person accessing the image forming apparatus. Deciphering of the encrypted document requires preparation of the encryption code table from the original document, and the encryption code table for deciphering the encrypted document cannot be prepared from any duplicate of the original. If a third person obtains the original, he or she can decipher the encrypted document. In such a case, however, the person having the document in his/her possession loses the document from the state at hand and, therefore, can easily sense the risk of leakage of information from the document and take suitable countermeasures.

It is to be understood that the object of the present invention may also be accomplished by supplying a system or an apparatus with a storage medium in which a program code of software which realizes the functions of the above-described embodiment is stored, and causing a computer (or CPU or MPU) of the system or apparatus to read out and execute the program code stored in the storage medium.

In this case, the program code itself read from the storage medium realizes the functions of the above-described embodiment, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program codes may be downloaded via a network.

Further, it is to be understood that the functions of the above-described embodiment may be accomplished not only by executing a program code read out by a computer, but also by causing an OS (operating system) or the like which operates on the computer to perform a part or all of the actual operations based on instructions of the program code.

Further, it is to be understood that the functions of the above-described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-114455 filed Apr. 18, 2006, which is hereby incorporated by reference herein in its entirety.

What is claimed is:

1. An encryption device that encrypts information formed on a recording member on the basis of an encryption code, the device comprising:

an irradiation portion configured to irradiate a surface of the recording member with laser light, the laser light emitted from the irradiation portion being reflected by irregularities in the irradiated surface of the recording member to produce scattering light of which waves are interfered with each other;

an image taking portion configured to receive the produced scattering light to take a speckle pattern image of the irradiated surface of the recording member irradiated with the laser light; and a preparation portion configured to prepare the encryption code on the basis of the taken speckle pattern image of the irradiated surface with respect to the recording member;

wherein the information is constituted by a sequence of characters including at least one character, wherein the device further comprises:

a dividing portion configured to divide the taken speckle pattern image of the irradiated surface into a predetermined number of regions;

an assignment portion configured to assign all the characters constituting the sequence of characters to the divided regions; and a computation portion configured to compute a predetermined unique value with respect to each of the divided regions, and wherein said preparation portion is configured to prepare the encryption code by replacing all the characters respectively assigned to the divided regions with the predetermined unique values computed with respect to the divided regions.

2. An encryption device according to claim 1, further comprising an erasing portion configured to erase the encryption code prepared by said preparation portion, when the encrypted information is formed on the recording member.

3. An encryption device according to claim 1, wherein the predetermined unique value with respect to each of the divided regions is computed by the computation portion based on a contrast ratio computed as the magnitude of a brightness-darkness difference in the entire speckle pattern image from the light intensities of all divided regions.

4. An encryption method of encrypting information formed on a recording member on the basis of an encryption code for an encryption device including an irradiation portion, an image taking portion and a preparation portion, the method comprising:

an irradiation step of irradiating a surface of the recording member with laser light by the irradiation portion, the laser light emitted from the irradiation portion being reflected by irregularities in the irradiated surface of the recording member to produce scattering light of which waves are interfered with each other;

an image taking step of receiving the produced scattering light to take a speckle pattern image of the irradiated surface of the recording member irradiated with the laser light by the image taking portion; and a preparation step of preparing the encryption code on the basis of the taken speckle pattern image of the irradiated surface with respect to the recording member by the preparation portion;

wherein the encryption device further including an analysis portion having a dividing portion, an assignment portion and computation portion, wherein the information is constituted by a sequence of characters including at least one character, wherein the method further comprises:

a dividing step of dividing the taken speckle pattern image of the irradiated surface into a predetermined number of regions by the dividing portion;

an assignment step of assigning all the characters constituting the sequence of characters to the divided regions by the assignment portion; and a computation step of computing a predetermined unique value with respect to each of the divided regions by the computation portion, and wherein said encryption code is prepared in the preparation step by replacing all the characters respectively assigned to the divided regions with the predetermined unique values computed with respect to the divided regions.

5. An encryption method according to claim 4, wherein the encryption device further including an erasing portion, wherein the method further comprises an erasing step of erasing the encryption code prepared by said preparation portion, by the erasing portion, when the encrypted information is formed on the recording member.

6. An encryption method according to claim 4, wherein the predetermined unique value with respect to each of the divided regions is computed by the computation portion based on a contrast ratio computed as the magnitude of a brightness-darkness difference in the entire speckle pattern image from the light intensities of all divided regions.

7. An image forming apparatus comprising:

an image forming device for forming an image on a recording member, and an encryption device that encrypts information formed on the recording member on the basis of an encryption code, wherein the encryption device comprises:

an irradiation portion configured to irradiate a surface of the recording member with laser light, the laser light emitted from the irradiation portion being reflected by irregularities in the irradiated surface of the recording member to produce scattering light of which waves are interfered with each other;

an image taking portion configured to receive the produced scattering light to take a speckle image of the irradiated surface of the recording member irradiated with the laser light;

and a preparation portion configured to prepare the encryption code on the basis of the taken speckle pattern image of the irradiated surface with respect to the recording member;

wherein the information is constituted by a sequence of characters including at least one character, wherein the encryption device further comprises:

a dividing portion configured to divide the taken speckle pattern image of the irradiated surface into a predetermined number of regions;

an assignment portion configured to assign all the characters constituting the sequence of characters to the divided regions; and a computation portion configured to compute a predetermined unique value with respect to each of the divided regions, and wherein said preparation portion is configured to prepare the encryption code by replacing all the characters respectively assigned to the divided regions with the predetermined unique values computed with respect to the divided regions.

* * * * *